May 8, 1934.　　　　E. A. DICKEY　　　1,958,236
BRAKE MECHANISM FOR MOTOR VEHICLES
Filed April 19, 1932　　2 Sheets-Sheet 1
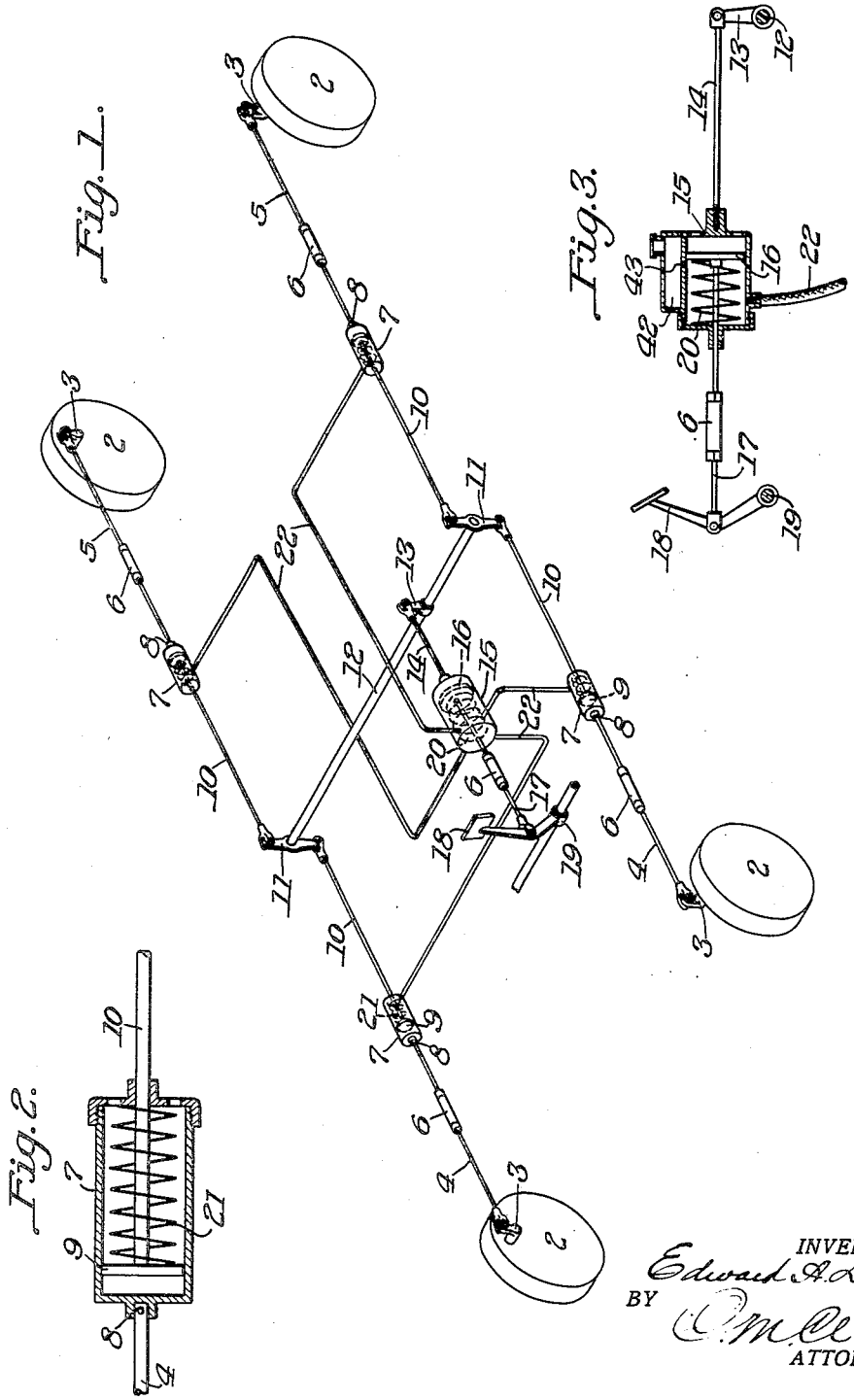
INVENTOR.
Edward A. Dickey
BY
C. M. Clarke
ATTORNEY.

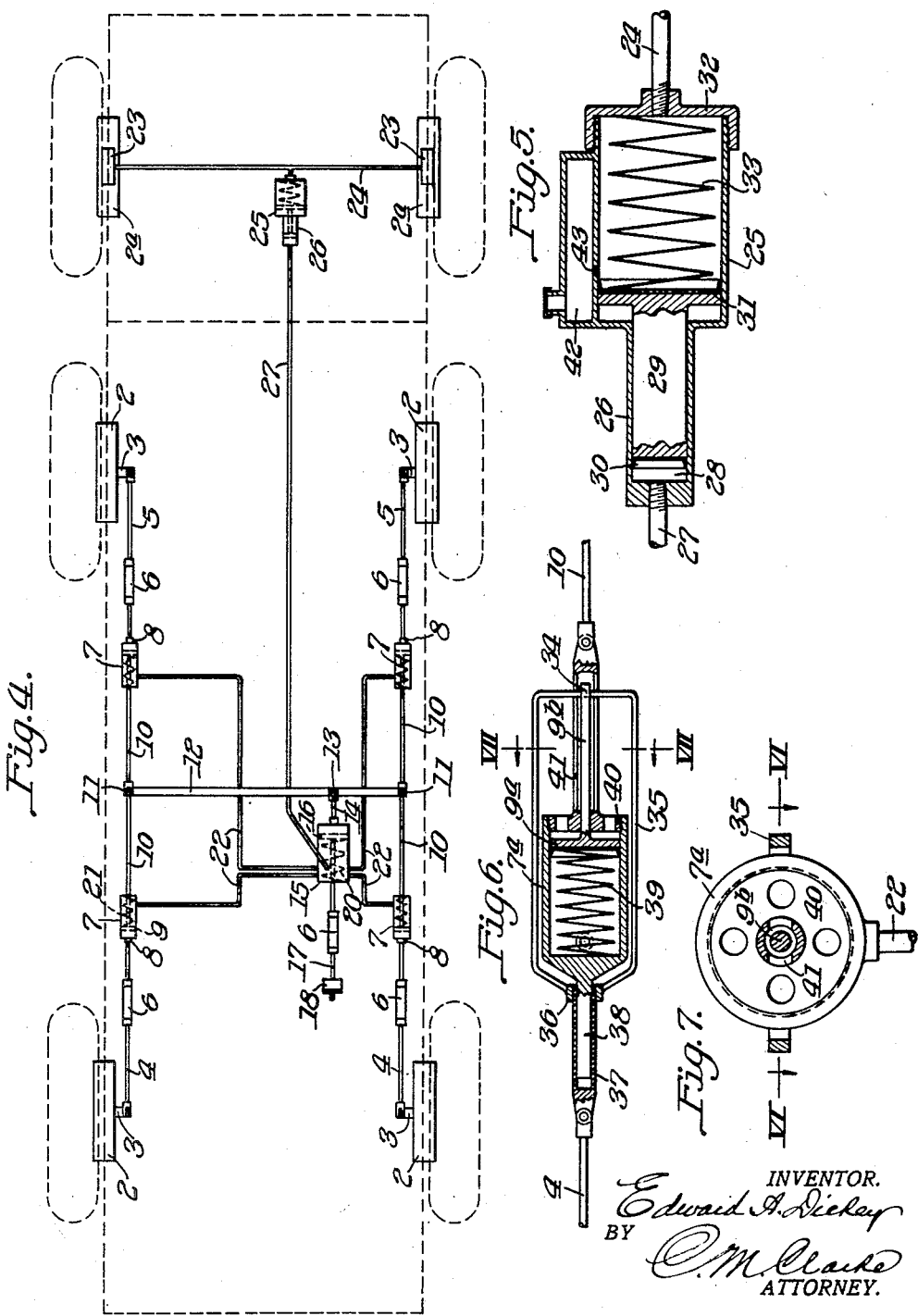

Patented May 8, 1934

1,958,236

UNITED STATES PATENT OFFICE 1,958,236

BRAKE MECHANISM FOR MOTOR VEHICLES

Edward A. Dickey, Aliquippa, Pa.

Application April 19, 1932, Serial No. 606,140

9 Claims. (Cl. 188—152)

My invention consists of an improvement in equalizing brake systems, utilizing a combination of fluid actuated and mechanically actuated means for applying equal pressure to the several individual braking units, as the usual expanding friction shoes of the wheel drums. The invention also discloses the combination with such a system of a supplemental application of braking power to the extra pair of wheels of a six wheel truck, and an improved construction of seepage proof cylinder, as hereinafter described.

In the drawings illustrating certain preferred forms of the invention:

Fig. 1 is a perspective diagrammatic view of the equipment as applied to a four wheel truck;

Fig. 2 is a sectional detail view of one of the brake rod cylinders;

Fig. 3 is a similar view of the master cylinder and its parts;

Fig. 4 is a plan view showing the system as applied to a six wheel truck;

Fig. 5 is a sectional detail view of the booster cylinder for application to the third pair of wheel brakes;

Fig. 6 is a similar view showing a modified form of seepage proof cylinder on the line VI—VI of Fig. 7;

Fig. 7 is a cross section on the line VII—VII of Fig. 6.

Referring to the drawings, 2 are the usual brake drums of a four wheel truck, each having a lever actuated rocking pin or cam shaft 3 operable to effect frictional braking resistance by tension of the pair of front connecting rods 4 and rear connecting rods 5. Each of said rods is provided with a turnbuckle 6 for adjustment thereof as may be required.

A series of four floating or movable service cylinders 7 are located in alinement with the connecting rods 4 and are connected as at 8 with each rod, whereby each cylinder becomes the pulling connecting link element of each rod. Within each cylinder is a piston 9 secured to the end of a secondary connecting rod 10, the other end of which is secured to the end of a double acting lever 11, one at each side of the equipment. Said levers are mounted on the ends of a transverse rock shaft 12 mounted in bearings on the chassis frame, and having an actuating lever 13.

Said lever is provided with a connecting rod 14 secured to the end of a master cylinder 15 having a piston 16 which in turn is provided with a rod 17 extending through the end of the cylinder and connected to the pedal actuated lever 18 having a pivotal bearing 19. Between the piston 16 and the end of the cylinder is a retracting spring 20 for resumption of normal position after each operation, and a similar spring 21 is inserted between each piston 9 and the opposite end of the several service cylinders 7.

A flexible tubing or piping system consisting of individual conductors 22 directly connects each service cylinder 7 with the master cylinder 15, maintaining a continuous column of liquid, as oil, from the master cylinder to and throughout the interior of the several service cylinders and their communicating connections. Such liquid being incompressible, it constitutes a mobile abutment or link between the pistons 9 and the end of each service cylinder 7 when held therein by the piston 16 of master cylinder 15. The forward movement of treadle 18, depending upon its extent of movement, will displace the liquid in the cylinder 15 to a corresponding degree, effecting simultaneous charging of liquid into each service cylinder 7.

Under such conditions, any slack throughout the full extent of each compound connecting rod and cylinder assemblage 4—7—10, between levers 11 and 3, is taken up, and the continuous connection between the levers is then practically rigid, by reason of the presence under pressure of the liquid in each service cylinder, avoiding any undesirable lost motion. Continued pressure of the pedal, acting through the then immobile body of liquid in master cylinder 15, moves said cylinder and connecting rod 14 forwardly, rotating rock shaft 12 and levers 11, and transmitting the brake applying or setting movement to the several connecting rod 4 and 5 assemblies, for simultaneous setting of the brakes for each of the four wheels of the truck. Upon release of pressure of the treadle, the tension due to liquid pressure will be relieved, assisted by springs 20 and 21, with relaxation and resumption of normal position of the parts, ready for the next application.

In Fig. 4 I show a development of the system to the application of braking power to a third pair of wheels, which are usually located at the rear end of a heavy burden truck.

Ordinarily such additional wheels are either not equipped with braking elements, or require a separate installation with additional power, and at very considerable expense. I have utilized for such purpose the same braking equipment as already disclosed including brake drums 2a each provided with a brake shoe expanding cylinder 23, to which fluid pressure is imparted by a cross connecting pipe, tube, hose, or other suitable connection 24.

Connection 24 leads to the outer large diameter end of a booster cylinder 25, having a reduced front extension 26. Leading into such reduced extension is the pipe or hose connection 27 which is connected directly with the master cylinder 15 already described, and whereby pressure is simultaneously exerted through all of the several pipe connections 22 and the branch 27, upon movement of treadle 18.

Booster cylinder 25—26 is designed to utilize such pressure with a minimum amount of displacement in the main active column of liquid entering the space 28 of the reduced extension 26. Plunger 29 having an expanding piston terminal 30 is provided at its opposite end with an enlarged similar piston 31 between which and the opposite end 32 of cylinder 25 is interposed a retracting spring 33.

By such construction I secure greater displacement of liquid in the enlarged diameter portion 25 of the cylinder, with the same force or pressure as is applied to the reduced piston 30, and with comparatively limited displacement of the latter. The so-called booster cylinder therefore is of great advantage in limiting the pressure imparting movement of the piston of the master cylinder.

Both the master cylinder and the booster cylinder are preferably provided with a liquid increment reservoir 42 communicating with the piston chamber by a reduced port 43 immediately beyond the expanding cup of the piston, in normal retracted position. By such arrangement the chamber is always full of liquid and back flow to the reservoir under initial pressure is immediately sealed by first inward movement of the piston.

Upon pressure being exerted against reduced piston or plunger 29 liquid in cylinder 25 will be displaced, exerting pressure through connections 24 to the oppositely acting pistons of each cylinder 23. The pressure thus exerted would depend upon the area ratio of pistons 30 and 31, being amply sufficient to set the brakes against drums 2a, with a comparatively limited amount of movement of plunger 29. By such construction I am enabled to effect the setting of the several brakes including the additional third pair of the extra pair of wheels without material increase of effort or extent of movement by the operator in actuating pedal 18.

Figs. 6 and 7 illustrate a modified construction of service cylinder 7a whereby to overcome or avoid the possibility of seepage or leakage of liquid therefrom, due to ineffective packing gaskets or the like which are avoided in the present construction. Thus cylinder 7a is provided with a piston 9a of expanding cup type having a stem 9b extending through the end of the cylinder, beyond the liquid receiving and containing chamber.

Extension 9b is connected at 34 with the yoke 35 extending backwardly at each side along and outside of cylinder 7a and fixedly connected as at 36 with the tubular extension 37 of connecting rod section 4. Such extension receives the guiding stem 38 of cylinder 7a providing for its extent of movement under relaxation of pressure and in connection with the action of spring 39, inserted between piston 9a and the opposite end of cylinder 7a. A connecting rod section 10 is directly coupled with the end 40 of cylinder 7a, being slotted as at 41 for clearance of yoke 35.

By such construction it will be seen that when initial movement of the treadle 18 applies liquid pressure throughout the system, the slack or lost motion in either or all of the connecting rod composite members will be taken up, thus ensuring a substantially rigid connection between levers 11 and 3, either forward or back, before the main actuating movement of lever 11 is exercised.

By such construction I also overcome the disadvantages of gradual loss of liquid, maintaining practically uniform efficiency, although with either construction of service cylinder I am enabled to immediately effect a continuous rigid continuity throughout each connecting rod assemblage, due to the compensation of any variations or inequalities in parts due to wear or the like.

I also accomplish with either construction the immediate setting of the power transmitting members so that each is thus adjusted independent of the other automatically and promptly, ensuring equal application of braking power to each braking unit with equally prompt and simultaneous release.

I thus avoid the necessity of individual mechanical adjustments or compensations, although the turnbuckles 6 may of course from time to time be utilized to lengthen or shorten the connecting rod sections 4. The turnbuckle adjustment may also be utilized in case of failure, loss, or other reasons eliminating the fluid charge, either from accident or design.

Thus by shortening the connecting rod or rods the piston of either the master cylinder or the service cylinders may be sufficiently tightened to draw the cylinder into tight abutting contact against the spring to positively engage the piston, whereby the parts are thus tightened mechanically for positive movement.

The same adjustment may be made by tightening the piston against the spring and cylinder end, as in the construction shown of the master cylinder, or with either service cylinder, depending on the location of the turnbuckle with relation to these parts.

It will also be obvious that the modified construction of service cylinder 7a may be utilized in the master cylinder, for the same purpose, when desired.

What I claim is:

1. In combination with a motor truck or the like provided with a master cylinder and piston and an actuating element therefor, a plurality of wheel brakes, a relatively movable power imparting member connected with the master cylinder and with each wheel brake, and a compensating element between the power imparting member and each wheel brake consisting of a cylinder and piston subject to pressure of the master cylinder, one being directly connected with the power imparting member and the other with the wheel brake.

2. In combination with a motor truck or the like provided with a master cylinder and piston and an actuating element therefor, a plurality of wheel brakes, a power imparting member connected with the master cylinder and with each wheel brake, and a mobile compensating element interposed between each wheel brake and the power imparting member consisting of a cylinder and piston subject to pressure of the master cylinder, one having direct mechanical connection with the power imparting member and the other having direct mechanical connection with the wheel brake.

3. In combination with a motor truck or the like provided with a master cylinder and piston and an actuating element therefor, a plurality of wheel brakes, a power imparting member connected with the master cylinder, a connecting rod member between each brake and the power imparting member having a compensating service cylinder, and a liquid conduit connecting each service cylinder with the master cylinder.

4. In combination with a motor truck or the like provided with a master cylinder and piston and an actuating element therefor, a plurality of wheel brakes, a power imparting rock shaft having oppositely acting levers, a connecting rod member between each brake and one of said levers having a compensating service cylinder, and a liquid conduit connecting each service cylinder with the master cylinder.

5. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, and a connecting rod between each brake mechanism and a lever of the power shaft.

6. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, and a connecting rod between each brake mechanism and a lever of the power shaft provided with an intermediate service cylinder connected with the master cylinder.

7. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, a connecting rod between each brake mechanism and a lever of the power shaft provided with an intermediate service cylinder and piston oppositely connected with sections of the connecting rod, and a liquid conduit connecting each service cylinder with the master cylinder.

8. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, a sectional connecting rod between each brake mechanism and a lever of the power shaft provided with a service cylinder connected to one section and a piston connected to the other section of the rod, and a liquid conduit connecting each service cylinder with the master cylinder.

9. In combination with a motor actuated vehicle provided with a power transmitting shaft having connecting rod levers, an operating lever, and a liquid-containing master cylinder and piston operatively connected with the power shaft and operating lever; running gear for the vehicle having brake mechanism, a sectional connecting rod between each brake mechanism and a lever of the power shaft provided with a service cylinder connected to one section and a piston connected to the other section of the rod, a lengthening and shortening device in one section of the rod, and a liquid conduit connecting each service cylinder with the master cylinder.

EDWARD A. DICKEY.